United States Patent
Duprat

(10) Patent No.: US 10,017,077 B2
(45) Date of Patent: Jul. 10, 2018

(54) TRACK SUPPORT OF AN ELECTRIC POWER SYSTEM AT GROUND LEVEL FOR LAND VEHICLES, RAIL COMPRISING SUCH A TRACK SUPPORT AND METHOD OF INSTALLATION

(71) Applicant: ALSTOM TRANSPORT SA, Levallois-Perret (FR)

(72) Inventor: Patrick Duprat, Le Raincy (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 563 days.

(21) Appl. No.: 14/616,938

(22) Filed: Feb. 9, 2015

(65) Prior Publication Data
US 2015/0224999 A1 Aug. 13, 2015

(30) Foreign Application Priority Data
Feb. 10, 2014 (FR) ..................... 14 51009

(51) Int. Cl.
*B60M 1/34* (2006.01)
*B61B 9/00* (2006.01)
(Continued)

(52) U.S. Cl.
CPC .............. *B60M 1/34* (2013.01); *B60L 5/42* (2013.01); *B60M 1/346* (2013.01); *B61B 9/00* (2013.01); *B60L 5/40* (2013.01); *B60M 1/36* (2013.01)

(58) Field of Classification Search
CPC .......... B60M 1/30; B60M 1/307; B60M 1/34; B60M 1/346; B60M 1/36; B60L 5/38; B60L 5/39; B60L 5/40; B60L 5/42
See application file for complete search history.

(56) References Cited

U.S. PATENT DOCUMENTS

| 435,487 | A | * | 9/1890 | Elliott | ...................... B60M 1/30 191/20 |
| 440,822 | A | * | 11/1890 | Brewer | .................... B60M 1/30 191/20 |

(Continued)

FOREIGN PATENT DOCUMENTS

| DE | 50 285 C | 1/1890 |
| EP | 2 088 025 A1 | 8/2009 |
| FR | 2 938 800 A1 | 5/2010 |

OTHER PUBLICATIONS

Preliminary Search Report dated Oct. 7, 2014 in French Patent Application No. 14 51009.

(Continued)

*Primary Examiner* — Zachary L Kuhfuss
(74) *Attorney, Agent, or Firm* — Eric L. Lane; Green Patent Law

(57) ABSTRACT

This support (36), as a profile in an electrically insulating material, comprises a substantially planar upper surface (50), provided with a longitudinal flute (60) intended for receiving a track segment, and a longitudinal groove (70) intended for receiving a low voltage electric power supply cable; and a lower surface (52) intended to bear upon a base for maintaining the support in the roadway. It is characterized in that the lower surface (52) is curved, preferably V-shaped, so that the support is concave so as to be at least transversely maintained in a recess with a mating shape, made in the base.

14 Claims, 7 Drawing Sheets

(51) Int. Cl.
*B60L 5/42* (2006.01)
*B60L 5/40* (2006.01)
*B60M 1/36* (2006.01)

(56) References Cited

U.S. PATENT DOCUMENTS

| | | | | |
|---|---|---|---|---|
| 489,835 A * | 1/1893 | Stark | ................ | B60M 1/30 |
| | | | | 191/20 |
| 514,134 A * | 2/1894 | Seymour | ................ | B60M 1/30 |
| | | | | 191/21 |
| 536,076 A * | 3/1895 | Grant | ................ | B60M 1/30 |
| | | | | 191/21 |
| 553,635 A * | 1/1896 | Anspach | ................ | B60M 1/30 |
| | | | | 191/21 |
| 565,453 A * | 8/1896 | Grunow, Jr. | ................ | B60M 1/30 |
| | | | | 191/21 |
| 575,346 A * | 1/1897 | Grunow, Jr. | ................ | B60M 1/30 |
| | | | | 191/21 |
| 584,511 A * | 6/1897 | Kloman | ................ | B60M 1/30 |
| | | | | 191/20 |
| 599,604 A * | 2/1898 | Gibbs | ................ | B60M 1/30 |
| | | | | 191/20 |
| 600,009 A * | 3/1898 | Maxham | ................ | B60M 1/30 |
| | | | | 191/21 |
| 606,968 A | 7/1898 | Hevner | | |
| 612,644 A * | 10/1898 | Grunow, Jr. | ................ | B60M 1/30 |
| | | | | 191/20 |
| 630,153 A * | 8/1899 | Willard, Jr. | ................ | B60M 1/30 |
| | | | | 191/20 |
| 2010/0175961 A1* | 7/2010 | Rameau | ................ | B60M 1/307 |
| | | | | 191/22 DM |
| 2011/0017531 A1* | 1/2011 | Re Fiorentin | ................ | B60L 5/42 |
| | | | | 180/65.1 |
| 2015/0274035 A1* | 10/2015 | Hourtane | ................ | B60M 1/36 |
| | | | | 191/6 |

OTHER PUBLICATIONS

Search Opinion in French Patent Application No. 14 51009.
Ficat T. et al., "APS: l'Alimentation Par le Sol, une solution renovatrice pour les tramways", Revue Generale des Chemins de Fer, vol. 182, pp. 25-40, Apr. 1, 2009.

* cited by examiner

TRACK SUPPORT OF AN ELECTRIC POWER SYSTEM AT GROUND LEVEL FOR LAND VEHICLES, RAIL COMPRISING SUCH A TRACK SUPPORT AND METHOD OF INSTALLATION

CROSS-REFERENCE TO RELATED APPLICATION

This application claims benefit of and priority to French Patent Application No. 14 51009, filed Feb. 10, 2014, which is hereby incorporated by reference in its entirety.

FIELD

The field of the invention is that of electric power systems at ground level for a land transportation vehicle, notably a tram.

BACKGROUND AND SUMMARY

More particularly, the invention relates to a track support of the track support type of an electric power supply system via the ground for a land vehicle, notably a tram, as a profile in an electrically insulated material, comprising: a substantially planar upper surface, provided with a longitudinal flute intended to receive a track segment, and with a longitudinal groove intended to receive a low voltage electric power supply cable; and a lower surface intended to bear upon a base for maintaining the support in the roadway.

A system for an electric power supply via the ground consists of a plurality of rails connected longitudinally to each other via junction casings.

Each rail includes an electric power supply track support and an electric power supply track, which is formed by a plurality of conductive segments longitudinally separated from each other by insulating segments.

Document FR 2 938 800 describes a track support assuming the shape of a honeycombed profile in glass fibers, comprising a substantially planar upper face, provided with a single longitudinal flute intended for receiving the segments of the track, and a planar lower face intended to bear upon the ground. The profile includes a core connecting the upper face to the lower face which is provided with at least one longitudinal power supply conduit, able to receive a low/high voltage power line intended to be connected to the conductive segments for bringing them to a potential suitable for the needs of the vehicle. The flute and the power supply conduit of a profile are positioned in a central and symmetrical way with respect to a longitudinal middle plane of the support perpendicular to the upper face of the latter.

For the case of a tramway, such a support has a length of about 11 m.

The method for implanting such a support consists of making a trench in the roadway to be equipped with such a system for supplying power via the ground. Once the trench has been cleared, a concrete apron is cast, in order to form a planar surface at the bottom of the trench. The track supports are then positioned on metal saddles attached to the apron. Next, an iron stringer is cast below and on the sides of the track support in order to guarantee its anchoring in the roadway.

The supports are mechanically connected two by two by a junction casing essentially formed by a pair of splice bars, on either side of the longitudinal axis of the supports and a metal hood obturating the junction casing from the top.

The power supply cable is placed in the central conduit of the supports and connected to a conductive segment. Finally the different insulating and conductive segments are attached in the flute of the profile.

The insulating segments are attached by adhesive bonding while the conductive segments are attached by adhesive bonding and screwing onto a support.

Such a support has different problems.

A first problem is related to the maintenance of the system. In the case of an operational accident or quite simply in the case of wear of different components of a rail, it is necessary to replace this component.

If this is replacement of a segment, in particular of a conductive segment, the latter being attached by adhesive bonding and screwing to the support, detachment of the segment of the support often leads to degradation of the actual support.

The replacement of the support is extremely complex. This means breaking the concrete stringer in order to expose the saddles for attaching the support to be replaced. Next, this means resuming the different installation steps mentioned above for installing the new support.

Such a maintenance operation necessarily takes a lot of time (about 1 month). It will be understood that, when this means carrying out a maintenance operation at busy crossroads, within a city for example, it is therefore necessary to reduce the intervention time.

A second problem lies in the robustness of the support. In practice it is found that a honeycombed profile and in glass fibers has insufficient mechanical strength.

A third problem is related to the making of curves.

In a one-piece version of the track support, the latter may be slightly bent so as to have a radius of curvature greater than or equal to 95 m. A one-piece support cannot be further bent.

However, such a support has to be bent at the factory and then provided on the installation site.

In order to produce curves having a smaller radius of curvature, a multi-piece version of the support shown above has been proposed. According to this version, the core of the support is subdivided into three narrower sections, along two sectional planes parallel to the middle plane of the support. Each section of the support may be bent with a radius of curvature of less than 95 m in order to obtain radii of curvature as small as the turning radius of the vehicle using the power supply system. For a tram, the turning radius is of about 18 meters.

However, these three sections of the support have to be bent at the factory and also attached together at the factory, before the thereby made support is provided on the installation site.

One understands the logistic problems encountered during the installation of such a support.

The object of the invention is therefore to overcome these problems by notably proposing a support able to be easily detached from its concrete base and which has increased robustness.

The object of the invention is a track support of the aforementioned type, characterized in that the lower surface is curved, preferably V-shaped, so that the support is convex so as to be, at least transversely, maintained in a recess with a mating shape, made in the base for maintaining the support in the roadway.

According to advantageous but not mandatory aspects of the invention, such a support may incorporate one or several of the following features, taken in any technically admissible combination:

the lower surface of the support is crenellated along a longitudinal direction of the profile formed by the support so as to be, at least longitudinally, maintained in the recess of the mating shape, made in the base.

the lower surface comprises transverse offsets participating in maintaining the support in position in the recess.

the support is made in one piece of material, and in that the support is in an elastomeric material so that the support is elastically deformable.

side edges of the support, connecting the lower surface and the upper surface are provided with through-holes for inserting pins allowing direct attachment of the support on the base.

a bottom of the flute is in communication with the groove, and edges of the bottom of the flute, located on either side of the groove are provided with recesses for accommodating means for attaching a segment on said support.

each sidewall of the groove includes a lateral passage opening into an associated recess of the bottom of the flute, in order to allow the setting into place of a gib at the bottom of said recess in order to receive a bolt by screwing, allowing attachment of a segment on said support.

the upper surface includes side faces, positioned on either side of the groove, each of the faces being tilted so as to have a tilt angle b relatively to a horizontal plane, the tilt angle having a value between 0 and 4°, notably 2°.

each lateral face of the upper surface of the support includes a pattern promoting water flow, and adherence to the support.

each lateral edge of the support is provided with a channel extending longitudinally through the support and connecting together both transverse end faces of the support, said channel being intended to receive an antenna cable.

the support has a reduced length and the groove forms a cavity, each transverse end face being provided with an orifice opening into the cavity capable of receiving the end of a tube for bringing a low voltage power supply cable and/or an antenna cable.

each lateral edge of the support being provided with a channel extending with an angle so as to connect a transverse end lateral face of the support to a sidewall of the groove for circulating an antenna cable.

The object of the invention is also a method for implanting a support compliant with the previous support, characterized in that it includes the steps: clearing a trench in a roadway; casting a concrete apron; positioning the support by means of a template, the support being provided with anchoring dowel pins placed in the through-holes with which the lateral edges of the support are provided, the support being optionally stressed so as to give it a suitable radius of curvature; casting a concrete base substantially up to the height of the upper face of the support; attaching by screwing, through the through-holes, the support to the base for maintaining the support in the roadway.

The object of the invention is also a rail of a system for supplying power via the ground, characterized in that it includes a plurality of supports positioned end to end on a concrete base for maintaining said supports in the roadway, each support being a support compliant with the previous support, and a plurality of conductive and insulating segments, two successive conductive segments being separated from each other by at least one insulating segment, the segments forming together the track and being received in the flutes of the supports.

Preferably, two successive supports are secured to each other by means of a junction sheet shaped so as to have a shape mating that of the lower surfaces of the supports to be connected and able to avoid possible electric leakages.

The object of the invention is also a method for implanting a rail compliant with the previous rail, characterized in that it includes the steps: clearing a trench in a roadway; casting a concrete apron; by means of a template, positioning the different constitutive supports of a rail section and the tube for bringing the antenna and low voltage power supply cables, the supports being provided with anchoring dowel pins placed in the through-holes with which the lateral edges of each support are provided, the supports being optionally stressed so as to give them a suitable radius of curvature; casting a concrete base substantially up to the height of the upper face of the supports; having the antenna cable circulate in the channels of the supports and connecting the low voltage power supply cable to the conductive segment of the rail section; attaching by bolting the conductive segments and the insulating segments of the track of the rail section in the flutes of the various supports.

BRIEF DESCRIPTION OF THE DRAWINGS

The invention and other advantages thereof will become more clearly apparent in the light of the description which follows of an embodiment of a support according to its principle, only given as an example and made with reference to the appended drawings wherein.

DETAILED DESCRIPTION

Figure 1:
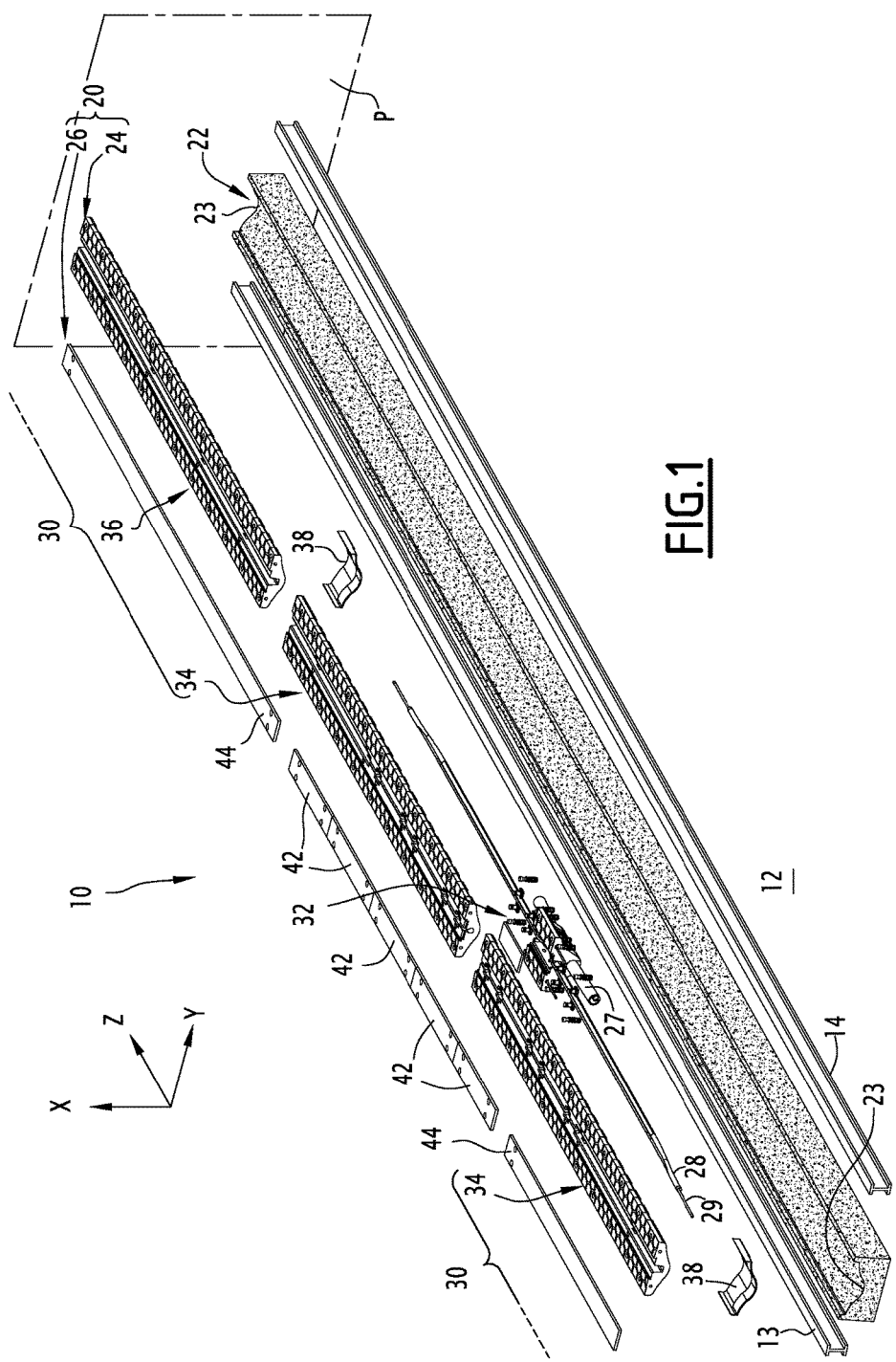
FIG. 1 is an exploded perspective illustration of the different constitutive elements of a rail section of a system for supplying electric power through the ground for a tramway.
Figure 2:
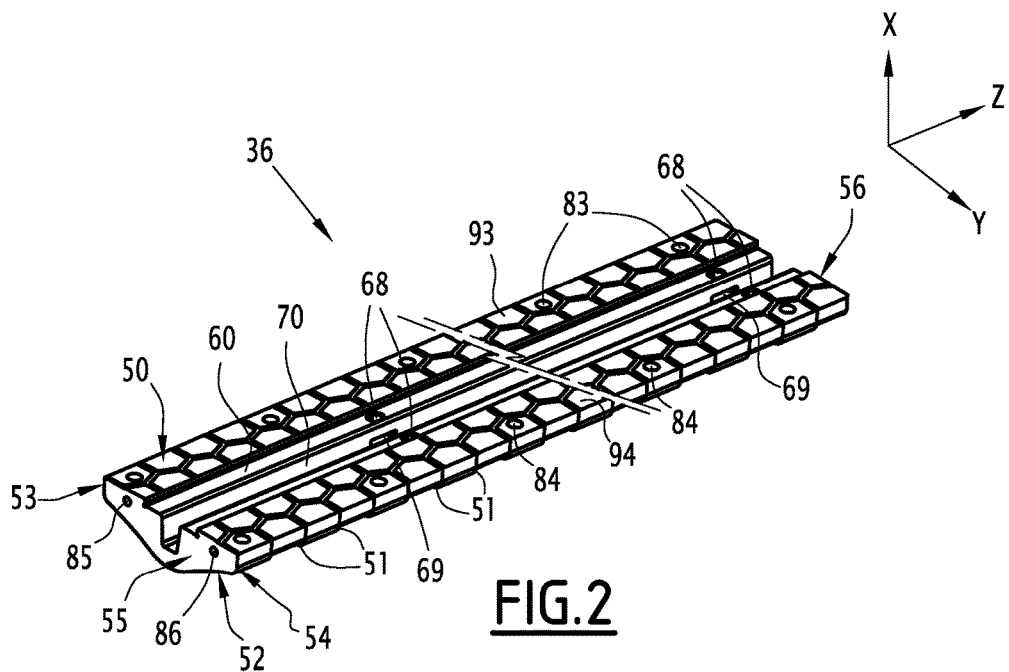
FIG. 2 is a perspective view in depth of an intermediate support of the rail section of FIG. 1.
Figure 3:
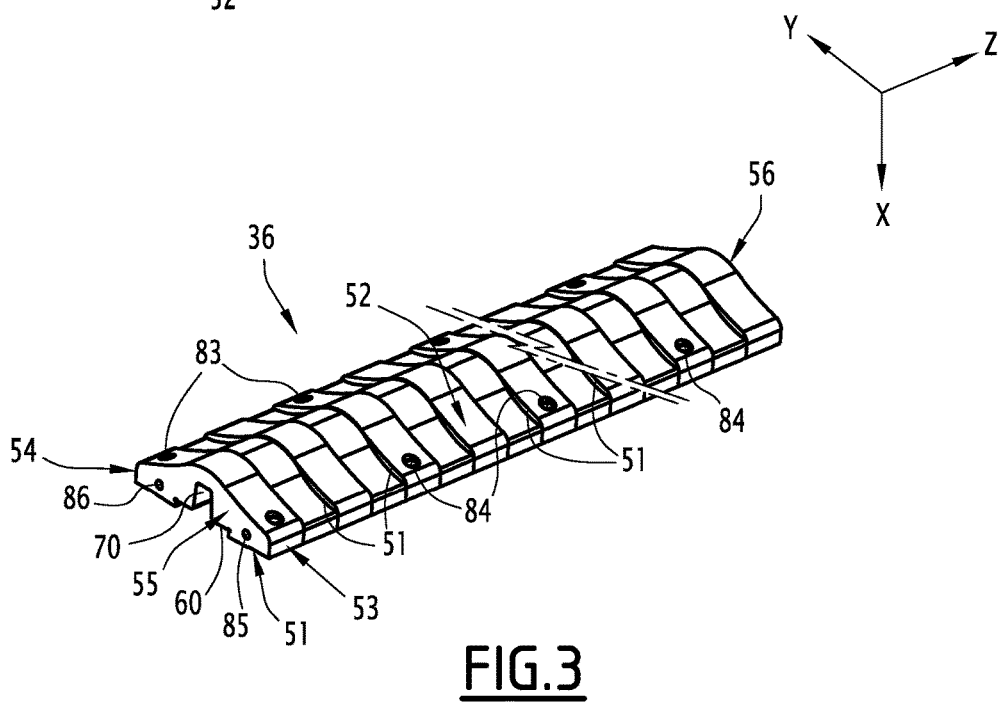
FIG. 3 is a low angle perspective view of the support of FIG. 2.
Figure 4:
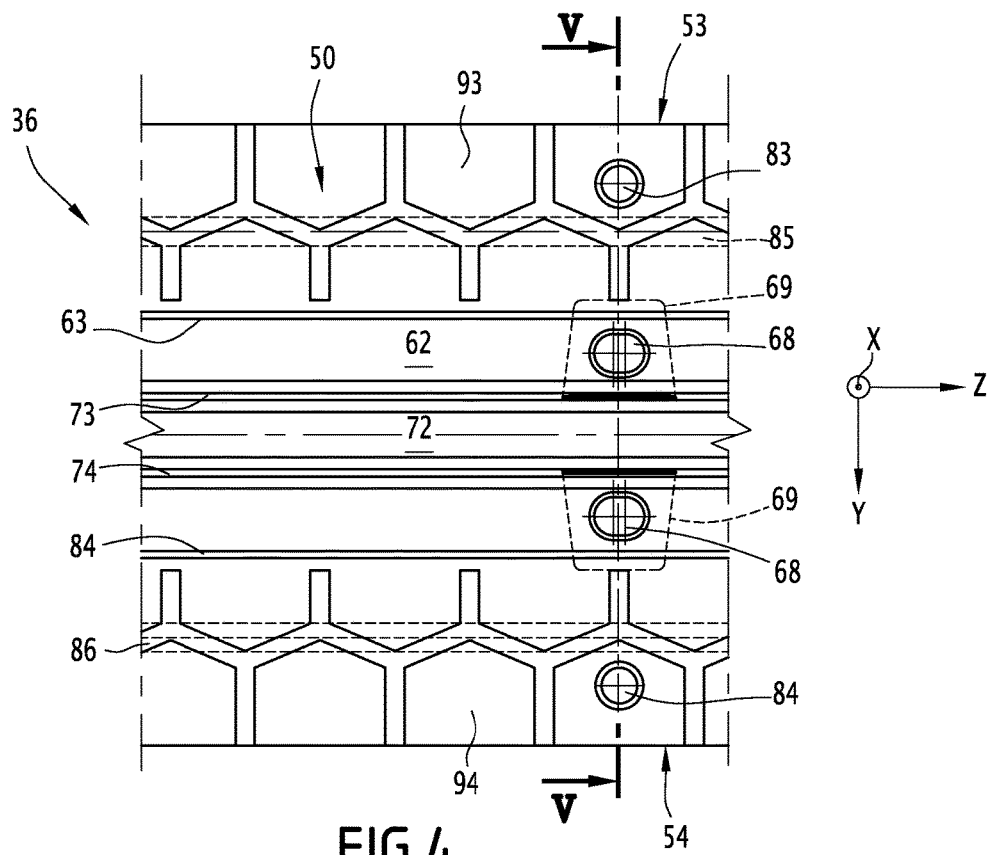
FIG. 4 is a partial top view of the intermediate support of FIGS. 2 and 3.
Figure 5:
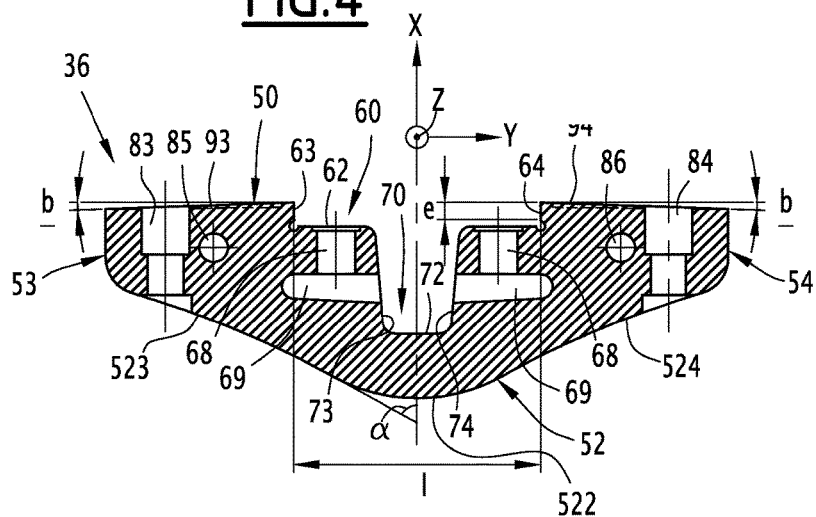
FIG. 5 is a section in a transverse plane of the intermediate support of FIGS. 2 and 3.
Figure 6:
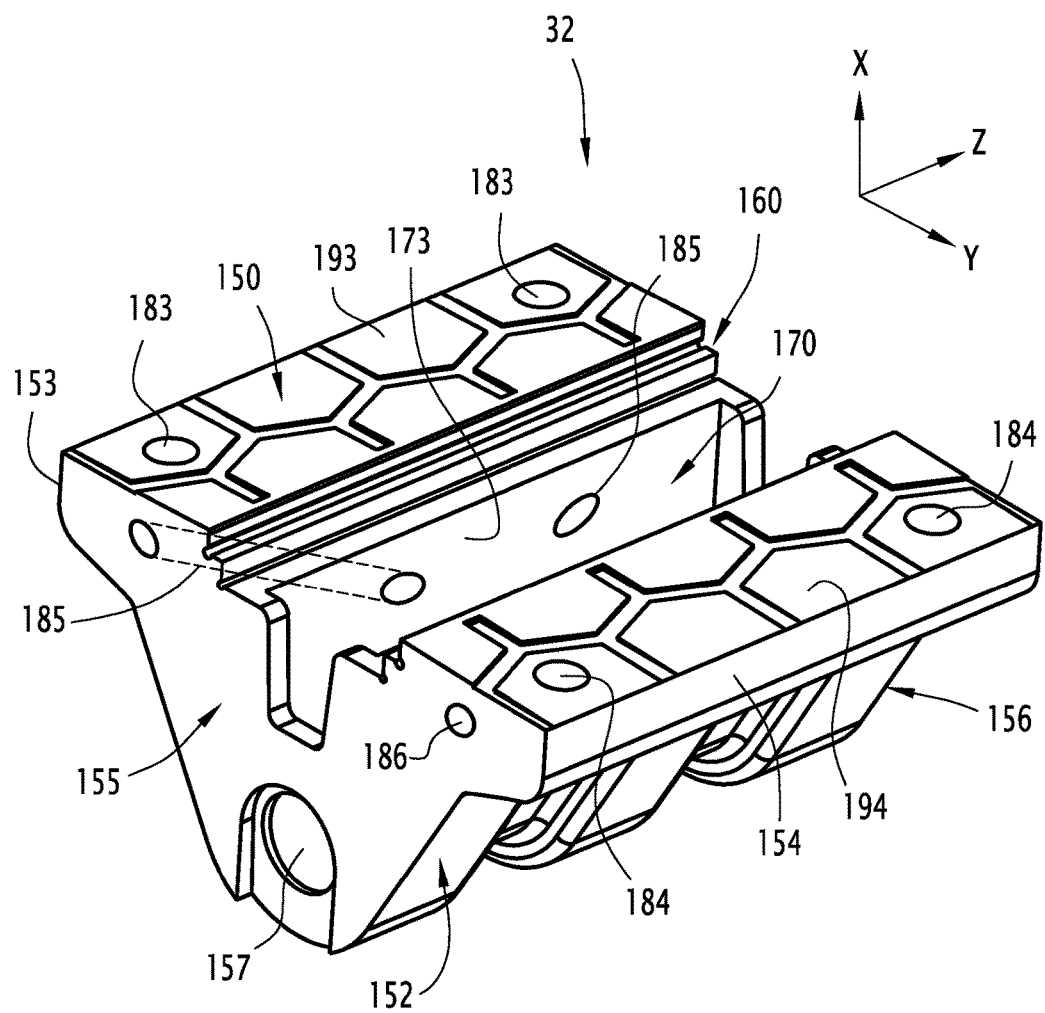
FIG. 6 is a perspective view in depth of a junction support between two rail sections.
Figure 7:
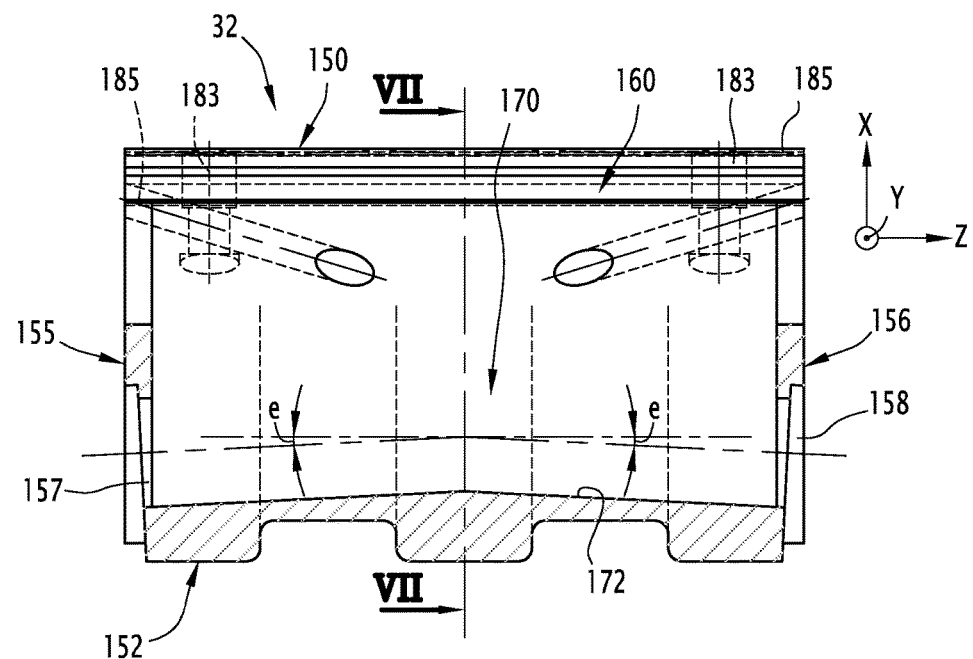
FIG. 7 is a sectional view along a middle plane of the junction support of FIG. 6.
Figure 8:
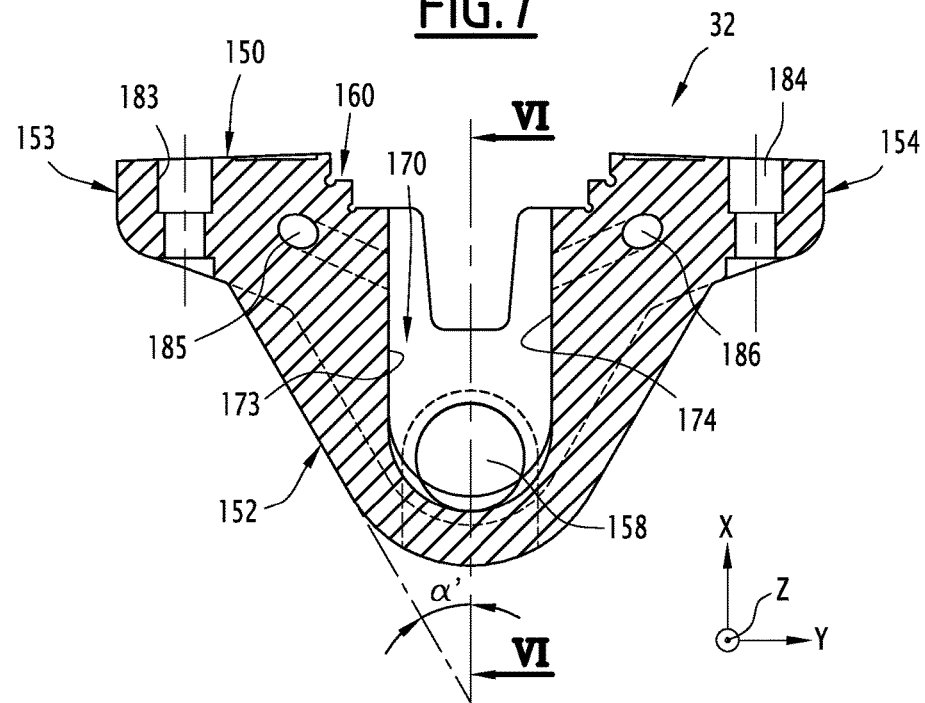
FIG. 8 is a sectional view along a transverse plane of the junction support of FIG. 6.
Figure 9:
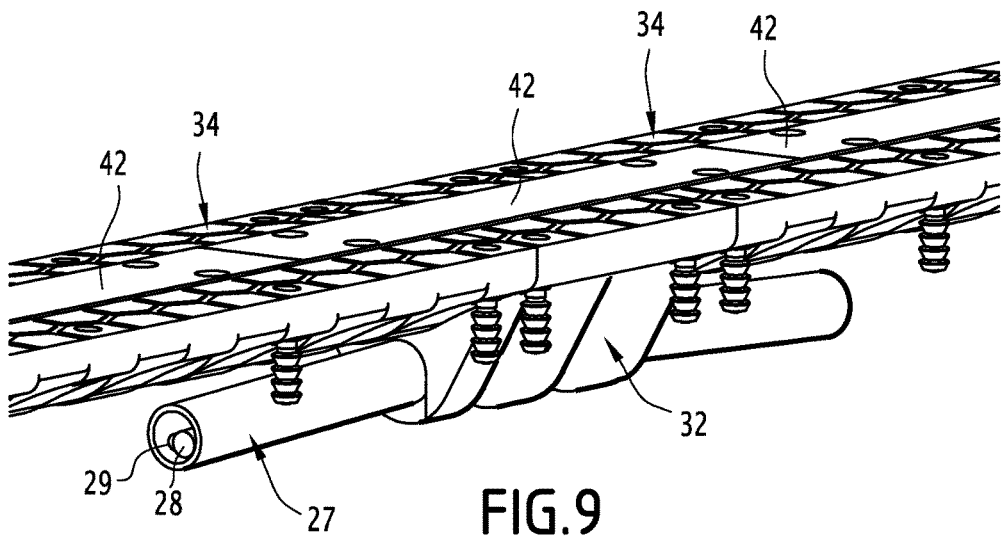
FIG. 9 is a low angle view of a junction support between the ends of two intermediate supports and of a tube for bringing the antenna and low voltage power supply cables.

With reference to FIG. 1, a system for supplying electric power through the ground 10 is intended to be implanted in a roadway 12 between both rails 13 and 14 of the rolling track of the tramway.

The system 10 includes a rail 20 maintained in position in the roadway 12 by a base 22.

The system 10 also includes a low voltage supply means and a means for detecting a tram.

A rail 20 is formed by a track support 24 and a track 26. The track 26 is accommodated in a flute of the track support 24.

The track support 24 is made by assembling along a longitudinal direction Z several track support 30 sections via a junction support 32.

Such a track support section is illustrated in FIG. 1. A track section itself consists of several intermediate supports. In the embodiment illustrated in FIG. 1, a track support section 30 successively includes a first intermediate end support 34, a first central intermediate support 36, a second central intermediate support 36, a second end intermediate support 34. For the sake of clarity, in FIG. 1, only a first half of the track support section 30 is illustrated, the second half of the track support section 30 being symmetrical to the first with respect to a transverse plane P.

The track 26 is produced by assembling along the longitudinal direction Z, a plurality of segments including conductive segments 44 and, between two successive conductive segments, insulating segments 42.

As illustrated in FIG. 1, an insulating segment 42 covers a junction support 32 and the adjacent end portion of both end intermediate supports 34 connected through this junction support. A conductive segment 44 covers the portion, which is not covered by the insulating segment 42, of each end intermediate support 34 of a support section, as well as the first and second central intermediate supports 36.

An insulating segment 42 consists in an electric current insulating material, while a conductive segment 44 consists in a metal material conducting electric current.

The segments have a parallelepipedal plate shape with a thickness e and with a width I, small as compared with their length L.

Now referring to FIGS. 2 to 5, a central intermediate support 36 will be described in detail.

The support 36 is a solid profile extending along the longitudinal axis Z.

The support 36 is made in an elastomeric material based on natural or synthetic rubber, such as EPDM (according to the acronym "Ethylene-Propylene-Diene Monomer"). In this way, the support 36 has some elasticity. In particular, the support 36 may be elastically deformed by applying a suitable force, so as to give a predetermined radius of curvature to the support 36 when making a curved rail.

Such an elastomeric material also has great impact resistance and good electric insulation.

Without any stresses, the support 36 is symmetrical with respect to a middle plane XZ, the axis X being intended to be positioned substantially vertically when the support 36 is implanted into the roadway 12.

The support 36 includes an upper surface 50, a lower surface 52, lateral edges 53 and 54, connecting together the upper and lower surfaces. The support 36 also includes transverse end faces 55 and 56.

Whereas the upper surface 50 is substantially planar and is intended to be positioned in a substantially horizontal plane when the support 36 is implanted, the lower surface 52 is, cross-sectionally, curved so that the support is convex outward and may be received and transversely maintained in a recess of conjugate shape made in the base 22.

Preferably, the lower surface 52 has a V-shape. More specifically, along a transverse section (illustrated in FIG. 5), in the vicinity of the middle plane XZ, the lower surface 52 has a central circular arc section 522 which extends towards the lateral edge 53, 54 respectively, with a substantially rectilinear lateral section 523, 524 respectively. The half-angle α of the opening of the "V" of the lower surface 52 is significant, between 70 and 80°.

Such a shape of the lower surface 52 allows good distribution of the forces. It also allows the support to be easily removed from its housing in the base 22.

Alternatively, the central section of the lower surface 52 is more spread out and the angle α is smaller, the support then becoming more trapezoidal, or even rectangular. However, such a shape requires the use of a larger amount of material for making the support, which therefore has a greater cost. Further, the smaller the angle α, the more it is difficult to extract the support out of the base, which complicates maintenance operations.

The thickness of the support 36 therefore decreases from the middle plane XZ towards each lateral edge 53, 54.

Longitudinally, the lower surface 52 is crenellated. The thereby formed transverse offsets 51 in the surface 52 participate in maintaining the support 36 in position in a conjugate recess 23 made in the base 22.

The upper surface 50 is provided with a longitudinal and central flute 60, including a bottom 62 and lateral walls 63 and 64 respectively.

The dimensions of the flute 60 are adapted to those of a segment, so as to adjustably receive such a track segment. More specifically, the width of the flute corresponds to the width I of a segment, and the depth of the flute corresponds to the thickness e of a segment. Consequently, in position, a segment is flush with the upper surface 50 of the support on which it is attached.

The support 36 includes a longitudinal and central groove 70 which opens onto the bottom 62 of the groove.

The groove 70 includes a bottom 72 and lateral walls 73 and 74 respectively.

The groove 70 opens onto the transverse end faces of the support 36.

The groove 70 is intended to allow circulation of a low voltage power supply cable, belonging to the supply means of the system, from a transverse end face of the support 36 as far as a point for mechanically and electrically connecting the conductive segment 44 received in the flute 60 of the support 36.

A segment received in the flute 60 is attached to the support 36 only with a bolt-nut assembly (not shown in the figures). For receiving such attachment means, the support 36 includes, on the bottom 62 of the flute 60, on either side of the groove 70, and regularly spaced apart longitudinally, a recess 68. The recess 68 extends parallel to the axis X. It has in a plane orthogonal to the X axis an elliptical section, the major axis of which is oriented along the axis Z.

At right angles to a recess 68, the sidewall 73, 74 respectively, of the conduit 70 includes a passage 69 substantially extending along the axis Y and opening onto the bottom of the corresponding recess 68. The passage 69 also has an oblong shape along the longitudinal axis. Such a passage allows the setting into place of a gib at the bottom of the recess 68. A bolt is inserted into a spacer through a suitable hole with which the segment to be attached is provided and inserted into the recess 68 in order to be associated by screwing with the gib positioned beforehand at the bottom of this recess 68.

A lateral edge 53, 54 respectively, is provided with through-holes 83, 84 respectively regularly spaced out longitudinally. A through hole 83, 84 connects the upper surface 50 of the support 36 to the lower surface 52 of the latter. A hole 83, 84 has an internal shoulder.

A hole 83, 84 is able to receive a pin for attachment by screwing of the support 36 into the base 22 for maintaining the support in the roadway 12. The head of the pin will bear upon the shoulder of the hole 83, 84 in order to maintain the support 36 secured to the base 22.

Each lateral edge 53, 54, respectively also includes a channel 85, 86, respectively, extending longitudinally and opening onto the transverse end faces 55, 56 of the support 36. Such a channel is intended to receive an antenna cable belonging to the means for detecting the presence of a tram.

The upper surface 50 of the support 36 has lateral faces 93 and 94 on each side of the flute 60.

A lateral face 93, 94 has, in a transverse plane, a tilt angle b relatively to a horizontal plane, so that said side face is tilted, from the middle plane XZ, towards the corresponding side edge 53, 54. The tilt angle b is for example 2°. This promotes the flow of rain water on the rail.

Further, each side face 93, 94, has a raised/recessed pattern. This further gives the possibility of improving the flow of the water and of increasing the friction coefficient between the support and the wheel of a vehicle rolling on the rail, in order to promote adherence.

The support 36 which has just been described is a central intermediate support. A similar description may be made of an intermediate end support 34. The only difference between both of these types of intermediate supports lies in the fact that on a first portion of the support 34, the groove 70 has a first width, while on a second portion of the support 34, the groove 70 has a second width, the first width being smaller than the second width, the second width being equal to that of the groove 70 of a central intermediate support 36. The first portion of the support 34 corresponds to the portion which has to be covered with an insulating segment 42, the second portion of the support 34 corresponding to the portion which has to be covered with a conductive segment 44. The first width is substantially equal to the diameter of the low voltage power supply cable so as to slightly tighten it in order to maintain it in position. The second width gives the possibility of accommodating mechanical and electrical attachment means of the power supply cable to the conductive segment 44.

In FIGS. 6 to 9, a junction support 32 is illustrated between two track support sections.

A junction support forms an alternative for producing an intermediate support, such as the support 36 described earlier in detail. Accordingly, an element of the junction support 32 similar to an element of the support described in FIGS. 2 to 5 is identified with the same reference number increased by one hundred.

The junction support 32 thus includes an upper surface 150.

The junction support 32 includes a lower surface 152 with the general shape of a «V». The thickness of the junction support 32 is greater than that of the support 36. Since they have the same width, the opening half-angle α of the «V» of the support 32 is reduced. The lower surface 152 is crenellated with a pitch identical with that of the intermediate supports.

The junction support 32 includes lateral edges 153 and 154, connecting the upper 150 and lower 152 surfaces, and transverse end faces 155 and 156.

The junction support 32 has a reduced length.

The upper surface 150 is provided with a central flute 160 and a groove 170 at the bottom of the flute 160.

In this alternative embodiment, the dimensions of the groove 170 are such that the latter defines a cavity inside the junction element 32.

Each transverse end face 155, 156 respectively, of the junction support 32 is provided with a circular orifice 157, 158 respectively, opening into the groove 170. The axis of the orifice 157, 158 is slightly tilted with respect to the axis X, by an angle e. This orifice is intended to receive the end of a tube 27 for bringing the low voltage power supply 28 and antenna 29 cables, as this is illustrated, assembled, in FIG. 9. The low voltage power supply cable is therefore introduced into the support at a junction support 32, and then circulates from the junction support through the groove 70 of the end and central intermediate supports so as to be finally connected to the conductive segment of the track.

Each end wall 155, 156 of the junction support 32, includes a notch, the contour of which corresponds to the cross-section of the conduit 70 of a neighboring intermediate support. This notch gives the possibility of letting through the electric power supply cable from the cavity to the junction support 32 directly in the conduit 70 of the neighboring intermediate support 34.

Each lateral edge 153, 154 is provided with through-holes 183, 184, allowing the junction support to be directly attached in the concrete base 22, by means of pins.

Each lateral edge is provided with an antenna channel 185, 186 respectively. However, the antenna channel 185, 186 forms an angle at substantially 45° with respect to the middle plane XZ so as to connect a transverse end face 155 or 156 to a sidewall 173 or 174 of the conduit 170. An antenna cable forms a loop associated with a support section 30. Thus, the antenna cable introduced into the support 24 at a first junction support 32, circulates in the channel 185 of the first junction support, in the channel 83 of the intermediate supports defining the support section 30, and then in the channel 183 of a second junction support; and then returns by circulating in a channel 184 of the second junction support, in the channel 84 of the intermediate supports defining the support section 30, and then in the channel 184 of the first junction support in order to again pass into the groove 170 of the latter. The antenna cable thus forms an induction loop allowing detection of the presence of a tram, plumb with the support section 30. This allows the substation for powering the conductive segment associated with this support section to be controlled upon passing of a tram.

Figure 10:
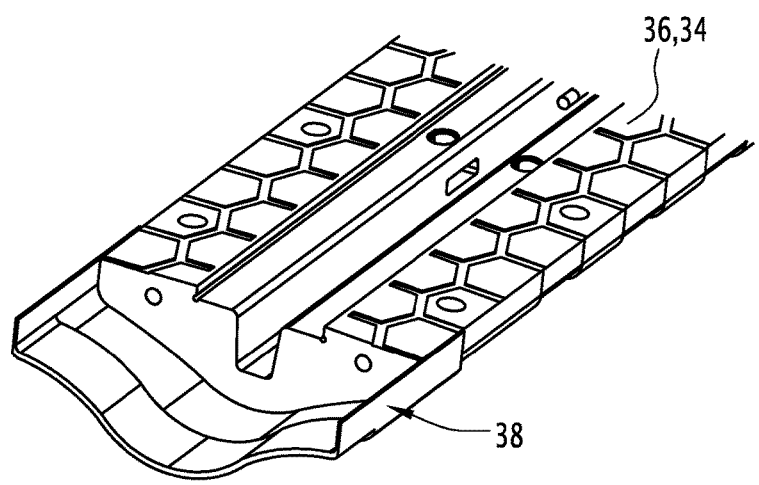
FIG. 10 is a perspective view of a junction sheet between two intermediate supports of a rail section of FIG. 1; and, FIG. 11 is a flow chart of a method for implanting the system for supplying power through the ground in a roadway.

In FIG. 10, is illustrated a connection sheet 38 between two consecutive intermediate supports 36 and 34. The sheet 38 is flexible and with a small thickness. It is made in an elastomeric material. It is used as a barrier preventing possible electric leakages into the ground. The sheet 38 is shaped so as to have an upper conjugate face of the lower surface 52 of the intermediate supports to be connected. In particular, the upper surface of the sheet 38 includes notches mating those of the ends of the intermediate supports to be connected. Each intermediate support is attached by adhesive bonding to the sheet 38. The offsets of the central notch of the upper surface of the sheet are respectively supported on an offset of the end notch of a support and on the offset of the end notch of the other support, so as to apply them longitudinally against each other.

Figure 11:
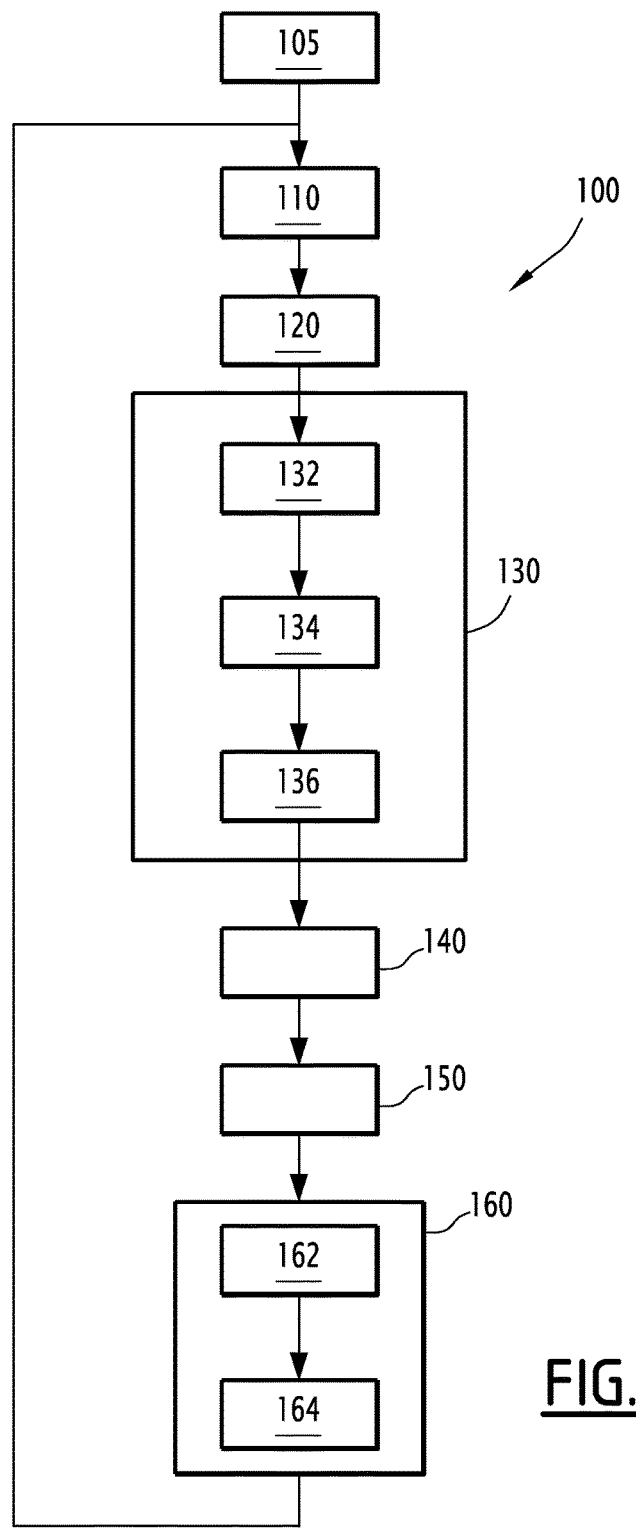

The method 100 for implanting a system for supplying electric power through the ground in a roadway will now be presented by means of FIG. 11.

In a step 105, carried out beforehand at the factory, a track support section 30 is made by associating the various intermediate supports 34 and 36 by means of junction sheets 38. Each sheet 38 is adhesively bonded to the ends of two neighboring intermediate supports. The thereby made section 30 is provided on the building site.

In a step 110, a trench is cleared in the roadway 12.

In the following step 120, in order to level the bottom of the trench, a concrete apron is cast. The track slab and the running rails are positioned on this apron in the case of a railway system.

Next, in step 130, by means of a template specifically suitable for this purpose, the section of the support 30 is pre-positioned above the apron.

It should be noted that during the pre-positioning of a support, the template is able to apply a suitable force allowing the support to be bent so as to give it a radius of curvature corresponding to a required profile. The template also allows accurate positioning of the support along the axis X, Y and Z and able to exert a suitable force giving the possibility of withstanding the pressure of the concrete or of the material used for making the base.

In a substep 132, the first junction support is positioned.

The section 30 is placed in the continuity of the end of the support section.

In a substep 134, the tube for bringing the antenna and electric power supply cables is drawn as far as the first junction support and connected to the latter. The power supply cable is passed through the first junction support, in the groove of the intermediate supports of the section 30, and then drawn so that its end reaches the point for connection to the conductive segment.

The outward bound antenna cable is passed through the first junction support, the intermediate supports and the second junction support of the section 30, and then upon returning, through the second junction support, the intermediate supports of the section 30 and the first junction support, so as to form a loop.

It should be noted that dowel pins are pre-positioned on the lower surface 52 and 152 of the supports, in the continuity of the through-holes 83, 84, 183, 184.

Next, in step 140, suitable concrete is cast between the apron and the supports so as to form the base 22 for maintaining the support in the roadway. The concrete is cast in an (either fixed or sliding) formwork until it reaches either the level of the upper surface of the supports or the low level of the edges 53, 54, 153, 154. Pre-positioning of the supports gives the possibility, at the moment when the concrete is cast, of reserving by molding, a recess in the base 22. This recess has a shape mating that of the lower surface 52, 152 of the optionally bent supports.

Once the concrete is set, in step 150, pins are screwed through the through-holes of the supports. These pins engage the dowels now anchored in the concrete of the base 22. By pressing the pin onto the shoulder of a through-hole it is possible to secure the support on the base.

In step 160, the track is made.

In a substep 162, the end of the low voltage electric power supply cable circulating in the groove of the supports is mechanically and electrically connected to the conductive segment.

In a substep 164, the segments are placed in the flutes of the supports, and then attached by bolting.

The method is then repeated for the next section.

Alternatively, the operation for drawing and connecting the electric power supply or antenna cables, is carried out, not at each repetition, but after installing the supports before putting into place the segments forming the track.

One skilled in the art will see that the maintenance of such an electric power supply system through the ground is extremely simple.

If a deteriorated track segment is to be replaced, it is sufficient to unscrew the bolts of the segment to be replaced, and then take it out from the flute. As the segment is not adhesively bonded to the support, the fact of detaching this segment does not deteriorate the support. The latter may therefore receive a replacement segment, which is attached on the support, instead and in the place of the deteriorated segment, as indicated above in the corresponding step of the installation method.

If a deteriorated support is to be replaced, it is sufficient to unscrew the corresponding pins for detaching the support from the base. The support is then disengaged by force from the recess with the shape of a cradle made in the base. Next a new support is set into place. As the crenellated shape of the lower surface of a support is standard, the replacement support is received in the recess of the base. When the deteriorated support has a radius of curvature, the replacement support is transversely deformed so as to be able to insert it by force into the recess made, so as to conform it with the radius of curvature of the recess. Once the replacement support is inserted into the recess, the latter stresses the support so that the support retains the radius of curvature which was given to it.

The pins are then put back into place for securing the support to the base. The track segments are then put back into place.

In the present application, by land vehicle is meant any vehicle involved in land transportation, guided on tires or on iron, of passengers or freight.

By land transportation guided on iron, is notably meant any transport of the railway type, of the urban type, for example a tramway, of the suburban type, for example metro, of the suburban type, of the regional type or of the high speed, very high speed type.

By land transportation guided on tires, is notably meant any land transport using tires, for example of the pneumatic metro, pneumatic tramway type, or further any type of land transport associated with electric tracks of the electric bus type, electric trucks or electric cars.

The invention claimed is:

1. A track support of an electric power system at ground level for a land vehicle, notably a tramway, as a profile made of an electrically insulating material, comprising:
- a substantially planar upper surface, provided with a longitudinal flute intended for receiving a track segment, and with a longitudinal groove intended for receiving a low voltage electric power supply cable; and
- a lower surface intended to bear upon a base for maintaining the support in the roadway, characterized in that the lower surface is curved, so that the support is convex so as to be at least transversely maintained in a recess with a mating shape made in the base for maintaining the support in the roadway, the support being made in one piece of material and the support being in an elastomeric material so that the support is elastically deformable.

2. The track support according to claim 1, characterized in that the lower surface of the support is crenellated along a longitudinal direction of the profile formed by the support, so as to be at least longitudinally maintained in the recess with a mating shape made in the base.

3. The track support according to claim 1, characterized in that the lower surface comprises transverse offsets participating in maintaining the support in position in the recess.

4. The track support according to claim 1, wherein lateral edges of the support, connecting the lower face and the upper face, are provided with through-holes for inserting pins allowing direct attachment of the support in the base.

5. The track support according to claim 1, wherein, a bottom of the flute is in communication with the groove, and edges of the bottom of the flute, located on either side of the groove, are provided with recesses for accommodating the means for attaching a segment on said support.

6. The track support according to claim 5, wherein each sidewall of the groove includes a lateral passage opening into an associated recess of the bottom of the groove, in order to allow the setting into place of a gib at the bottom of said recess for receiving by screwing a bolt allowing a segment to be attached on said support.

7. The track support according to claim 1, wherein the upper surface includes lateral faces, positioned on either side of the flute, each of the faces being tilted so as to have a tilt angle b with respect to a horizontal plane, the tilt angle having a value between 0 and 4°, notably 2°.

8. The track support according to claim 7, wherein each lateral face of the upper surface of the support includes a pattern promoting flow of water, and adherence to the support.

9. The track support according to claim 1, wherein each lateral edge of the support is provided with a channel extending longitudinally through the support and a connecting both transverse end faces of the support to each other, said channel being intended for receiving an antenna cable.

10. The track support according to claim 1, having a reduced length, and wherein the groove forms a cavity, each transverse end face being provided with an orifice opening into the cavity able to receive the end of a tube for bringing a low-voltage power supply cable and/or an antenna cable.

11. The track support according to claim 10, wherein each lateral edge of the support is provided with a channel extending with an angle so as to connect a transverse lateral end face of the support to a sidewall of the groove for circulation of an antenna cable.

12. A rail comprising:
 a plurality of supports positioned end-to-end on a concrete base for maintaining said supports in the roadway, each support being a support according to claim 1, and
 a plurality of conductive and insulating segments, two successive conductive segments being separated from each other by at least one insulating segment, the segments forming together the track and being received into the flutes of the supports.

13. The rail according to claim 12, wherein two successive supports are secured to each other by means of a junction sheet shaped so as to have a shape mating that of the lower surfaces of the supports to be connected and be able to avoid possible electric leakages.

14. The track support according to claim 1, wherein the lower surface is V-shaped.

* * * * *